United States Patent [19]

Miller et al.

[11] Patent Number: 5,635,140
[45] Date of Patent: Jun. 3, 1997

[54] SELF-AERATING SPENT CATALYST DISTRIBUTOR

[75] Inventors: Richard B. Miller, Katy; Paul L. Sestili, Houston, both of Tex.

[73] Assignee: The M. W. Kellogg Company, Houston, Tex.

[21] Appl. No.: 557,780

[22] Filed: Nov. 13, 1995

[51] Int. Cl.[6] ............................... F27B 15/08
[52] U.S. Cl. ..................... 422/144; 422/145; 422/139
[58] Field of Search ........................ 422/144, 145, 422/143, 147, 139

[56] References Cited

U.S. PATENT DOCUMENTS

| | | | |
|---|---|---|---|
| 4,051,069 | 9/1977 | Bunn, Jr. et al. | 252/417 |
| 4,150,090 | 4/1979 | Murphy et al. | 422/144 |
| 4,615,992 | 10/1986 | Murphy | 502/41 |
| 4,721,603 | 1/1988 | Krug et al. | 422/147 |
| 4,888,156 | 12/1989 | Johnson | 422/144 |
| 4,927,606 | 5/1990 | Cetinkaya et al. | 422/144 |
| 5,156,817 | 10/1992 | Luckenbach | 422/144 |

*Primary Examiner*—Christopher Kim
*Attorney, Agent, or Firm*—The M. W. Kellogg Company

[57] ABSTRACT

A spent catalyst distributor in a fluid catalytic cracking unit regenerator is self aerated by attaching to the underside of each trough arm a contiguous lip which captures rising aeration fluid and uses the aeration fluid to aerate spent catalyst flowing through the trough arms of the spent catalyst distributor. Orifices in the bottom plate of each trough arm pass the captured aeration fluid up into the spent catalyst flowing within the trough arm. The aeration fluid provides aeration and fluidization of the spent catalyst to facilitate the flow of the spent catalyst through the trough arms of the spent catalyst distributor.

18 Claims, 5 Drawing Sheets

5,635,140

SELF-AERATING SPENT CATALYST DISTRIBUTOR

FIELD OF THE INVENTION

This invention relates to a design for a spent catalyst distributor for a fluid catalytic cracking unit regenerator. More specifically, the present invention relates to the aeration of spent catalyst in a spent catalyst distributor.

BACKGROUND OF THE INVENTION

In a fluid catalytic cracking unit, catalyst flows in a continuous loop from a reactor, to a stripper, to a regenerator and back to the reactor. To maintain the catalyst in a fluidized state, the catalyst must be aerated. For example, a fluidized bed of catalyst is maintained in the regenerator where coke is burned off of the catalyst to regenerate the catalyst before recirculation to the reactor. Air is introduced to the regenerator for both combustion of the coke and fluidization of the catalyst.

In one well-known regenerator design, spent catalyst is conveyed from the stripper to the regenerator through a standpipe and distributed in the regenerator through a spent catalyst distributor. The spent catalyst distributor comprises a vertical centerwell with trough arms extending radially outwardly and downwardly from the top of the centerwell. Spent catalyst is introduced to the bottom of the centerwell where it rises upward through the centerwell and outward through the trough arms to a fluidized bed of catalyst in the regenerator. The spent catalyst flowing through the trough arms is aerated to maintain fluidization and flow. Otherwise, the spent catalyst can flow unevenly through the trough arms and can disrupt operation.

In the prior art design, aeration of the spent catalyst in the trough arms was accomplished by using small-bore piping to convey air to the individual trough arms of the spent catalyst distributor. The regenerator is operated at a high temperature to burn coke off of the catalyst, and the catalyst is abrasive. Consequently, the regenerator is a hostile environment for small-bore piping. Due to this hostile environment, operation of the small-bore piping can be difficult to maintain. Elimination of the small-bore piping used in the regenerator would be desirable to simplify the design of the regenerator and improve the reliability of the unit.

SUMMARY OF THE INVENTION

This invention improves aeration in a spent catalyst distributor in the regenerator section of a fluid catalytic cracking unit (FCCU). In one aspect, the invention provides a self-aerating spent catalyst distributor for a FCCU regenerator having a spent catalyst standpipe for receiving spent catalyst from a stripper, a valve to control catalyst flow, and a main air distribution system at a lower end of the regenerator for distributing aeration fluid into a bed of the catalyst for burning coke on a catalyst and for fluidizing the catalyst.

A centerwell is provided to receive catalyst at a lower end thereof from the standpipe for upward flow of spent catalyst to an upper end of the centerwell. A plurality of trough arms extend radially outwardly and downwardly from the centerwell adjacent the upper end thereof to distribute spent catalyst into the catalyst bed. Each arm includes an elongated bottom panel, upwardly extending walls on opposite longitudinal sides of the panel, an open top, and an open distal end. A contiguous lip extends downwardly from adjacent a perimeter of the bottom panels to capture a portion of the aeration fluid rising through the catalyst bed.

A plurality of orifices are formed in the bottom panels to aerate spent catalyst in the trough arms with the aeration fluid captured by the lips.

An even flow of the aeration fluid through the orifices into the spent catalyst can be facilitated by providing transverse separator plates to separate the lips into a plurality of sections, forming from two to twelve approximately equal lip sections under each trough arm, and preferably forming four approximately equal lip sections. Each section contains a plurality of orifices in the bottom panel of the trough arm. The orifices are sized to pass the captured aeration fluid up through the orifices and to inhibit the escape of the captured aeration fluid under the lips. The lips provide a static head to force the captured aeration fluid up through the orifices, and the lips are preferably vertical, but can be flared outwardly or inwardly from the bottom panels of the trough arms.

In another aspect, the invention provides an improvement in a FCCU regenerator having trough arms extending out from a centerwell for distributing catalyst into a catalyst bed above a main air distribution system for introducing aeration fluid into the bed to regenerate and fluidize the spent catalyst. The improvement comprises a contiguous lip extending downwardly from each trough arm, and a plurality of orifices formed in a bottom of each trough arm, wherein the lip captures aeration fluid from the catalyst bed and creates a static head to force the captured aeration fluid through the orifices and aerate the spent catalyst passing through the trough arms.

Transverse separator plates can be used to separate the lips into a plurality of sections to facilitate even distribution of the captured aeration fluid into the trough arms. The separator plates preferably form from two to twelve approximately equal lip sections under each trough arm, each section containing a plurality of orifices. In one embodiment, the separator plates form four approximately equal lip sections under each trough arm, each section containing a plurality of orifices. The orifices are desirably sized to preferentially pass the captured aeration fluid through the orifices and inhibit passage of the captured aeration fluid under the lips. The lips provide a static head to force the captured aeration fluid through the orifices, and the lips are preferably vertical, but can be flared outwardly or inwardly from the bottom panels of the trough arms.

DETAILED DESCRIPTION OF THE INVENTION

Figure 1:
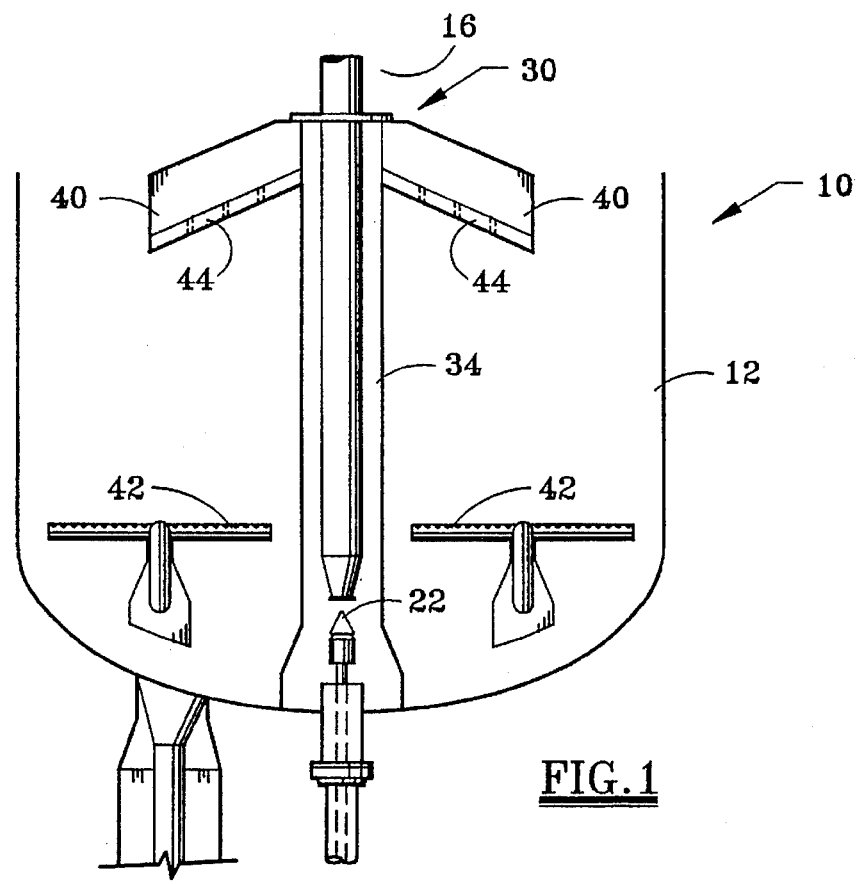
FIG. 1 schematically shows a spent catalyst distributor in a fluid catalytic cracking unit regenerator.
Figure 3:
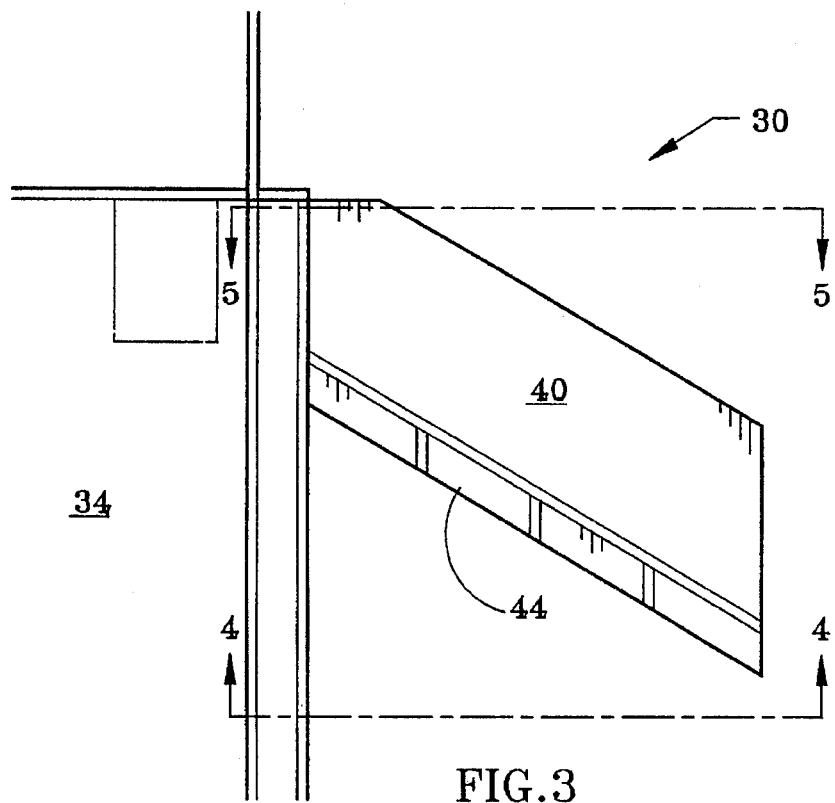
FIG. 3 is a side sectional view of a typical trough arm of the spent catalyst distributor of FIG. 2 as seen along the lines 3—3.
Figure 2:
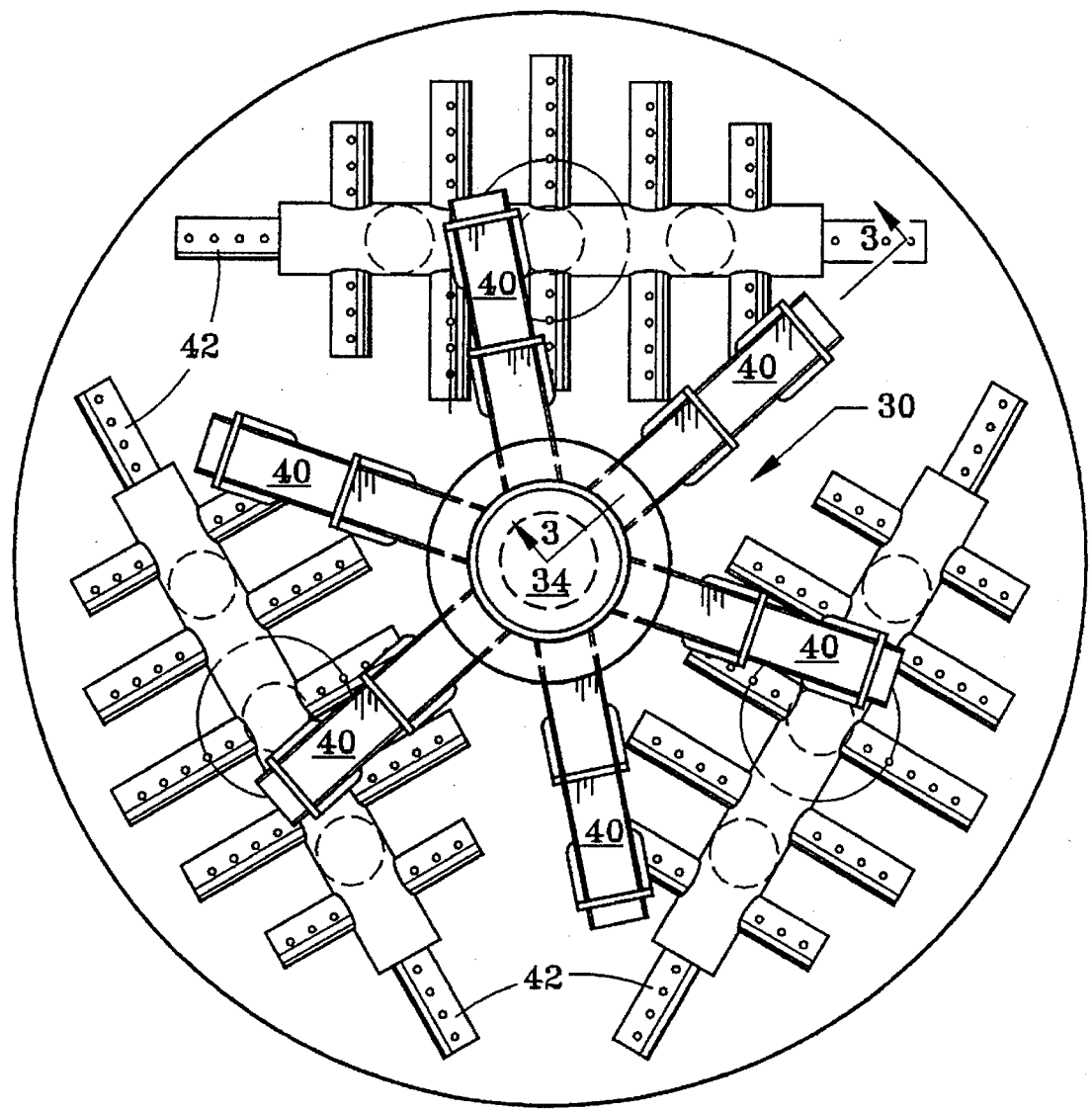
FIG. 2 is a plan view of a spent catalyst distributor in a fluid catalytic cracking unit regenerator.
Figure 6:
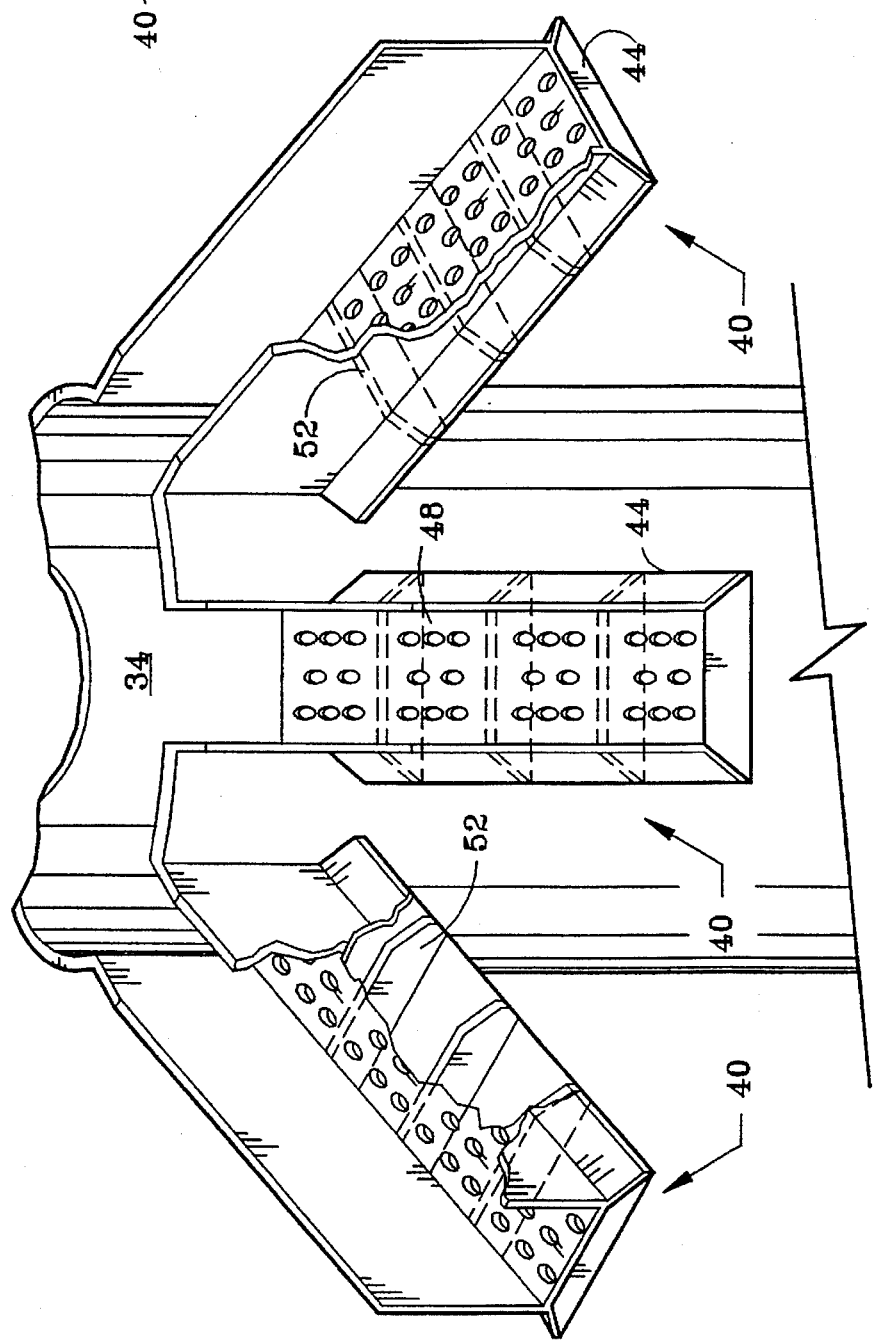
FIG. 6 is a perspective view, partially cut away, of an upper end of the spent catalyst distributor of FIG. 2.

This invention is a spent catalyst distributor useful, for example, in a fluid catalytic cracking unit (FCCU) regenerator. The spent catalyst distributor is self aerating in that aeration of spent catalyst flowing through the spent catalyst distributor is effected with aeration fluid available in the regenerator, and separately piped aeration fluid is not needed. In FIG. 1 a FCCU regenerator 10 is shown. A regenerator 12 employs a spent catalyst distributor 30. The spent catalyst distributor 30 has a centerwell 34 from which trough arms 40 extend radially outwardly and downwardly. FIG. 2 shows six trough arms 40, although the number thereof is not critical in the present invention. As best seen in FIGS. 3 and 6, a contiguous lip 44 is attached to each trough arm 40 along a perimeter of the underside of the trough arms 40.

Figure 4:
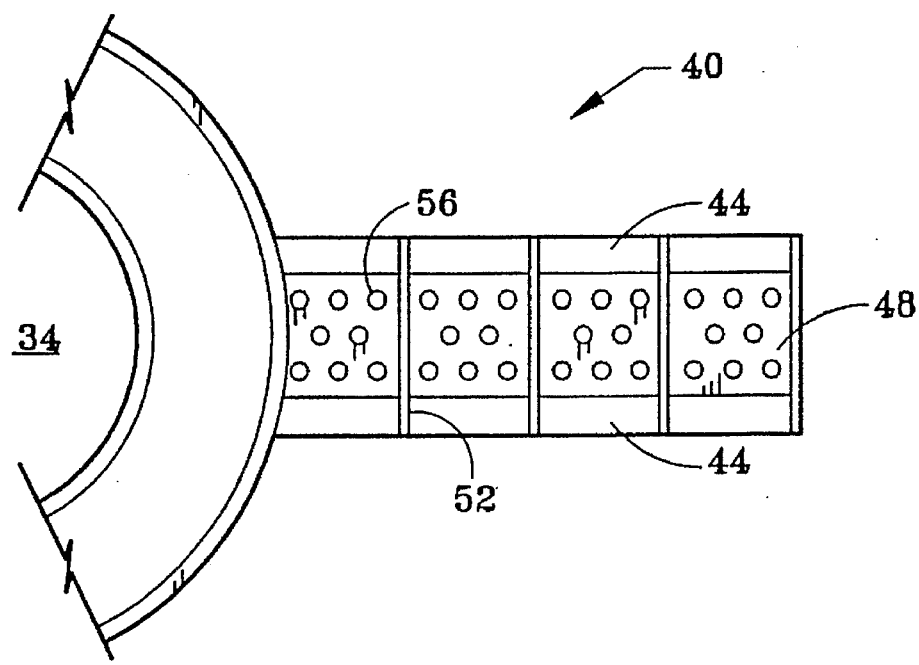
FIG. 4 shows the underside of a bottom panel of the trough arm of FIG. 3 as seen along the lines 4—4.
Figure 5:
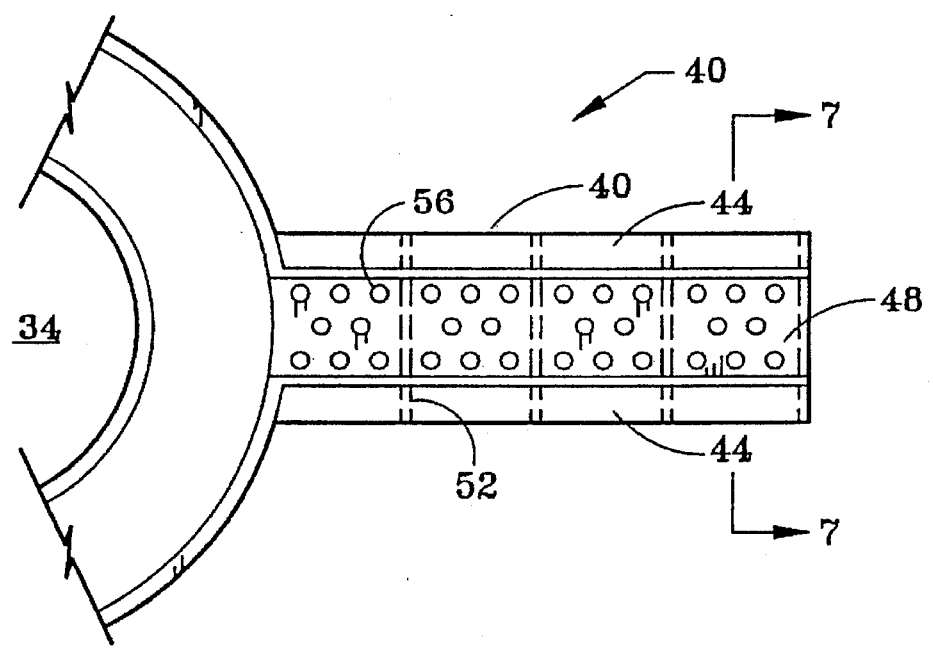
FIG. 5 shows the top side of a bottom panel of the trough arm of FIG. 3 as seen along the lines 5—5.
Figure 7:
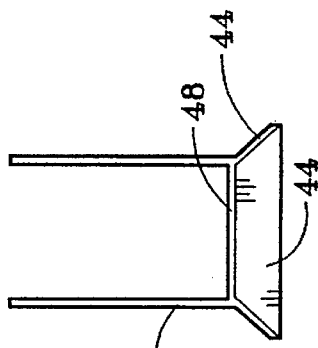
FIG. 7 is a cross-section of the trough arm of FIG. 5 as seen along the lines 7—7.

As best seen in FIG. 4, the underside of a typical trough arm 40 has a contiguous lip 44 and a bottom plate 48. The contiguous lip 44 is attached to the perimeter of the underside of the trough arm 40. The contiguous lip 44 is desirably vertical, but may be flared inwardly or outwardly from the bottom plate 48 of the trough arms 40 to either decrease or increase the amount of aeration fluid captured. Transverse separator plates 52 are located on the underside of the bottom plate 48 between the contiguous lips 44 and divide the trough arm 40 into four approximately equal sections. Orifices 56 are provided in each section of the bottom plate 48. As best seen in FIGS. 5 and 7, the trough arms 40 form channels open at a lower or distal end. As seen in FIG. 6, the trough arms 40 are also open to the centerwell 34.

Figures 8, 9:
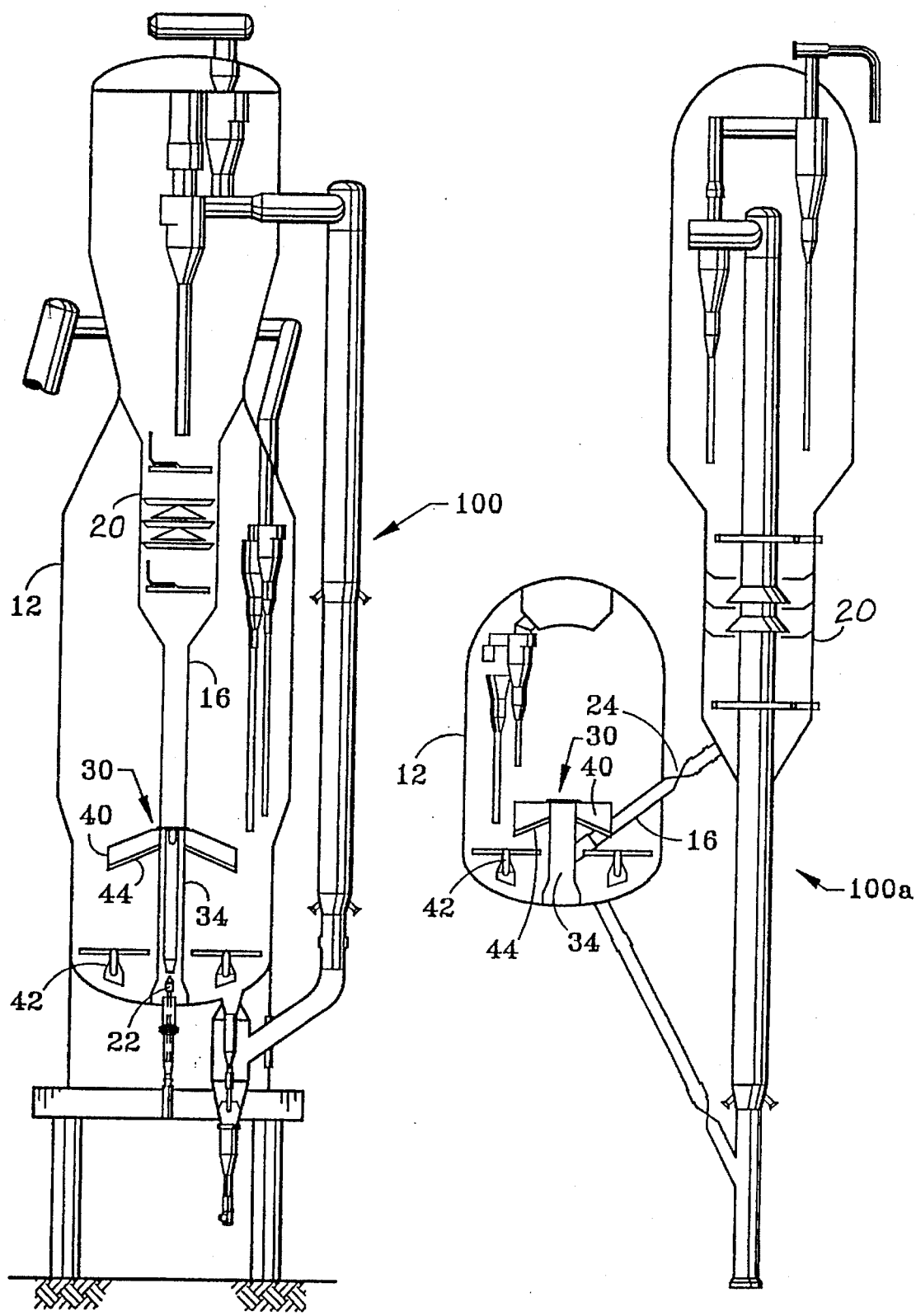
FIG. 8 schematically shows a typical fluid catalytic cracking unit employing a spent catalyst distributor according to an embodiment of the present invention.
FIG. 9 schematically shows another typical fluid catalytic cracking unit employing a spent catalyst distributor according to an alternate embodiment of the present invention.

With reference to FIG. 8, in the operation of a fluid catalytic cracking unit 100, a regenerator 12 receives spent catalyst from a stripper 20 via a standpipe 16. Spent catalyst flows downwardly through the standpipe 16 and into a centerwell 34 of the spent catalyst distributor 30. The spent catalyst flow is controlled via plug valve 22 and flows upwardly through an annular space in the centerwell 34. Upon reaching the top of the centerwell 34, the spent catalyst flows outwardly and downwardly through the trough arms 40.

FIG. 9 shows a second typical configuration of an alternative fluid catalytic cracking process 100a wherein a slide valve 24 is used to regulate the flow of spent catalyst from the stripper 20 to the regenerator 12, and the spent catalyst enters the spent catalyst distributor 30 from the side. Spent catalyst flows upwardly through the centerwell 34. Upon reaching the top of the centerwell 34, the spent catalyst flows radially outwardly and downwardly through a plurality of trough arms 40.

In each of the FIG. 8 and 9 configurations, the spent catalyst is regenerated in the regenerator 12 by introducing air to the regenerator 12 through main air grids 42. Air and combustion or exhaust gases (formed as coke is burned off the spent catalyst) rise upwardly through a bed of catalyst as spent catalyst flows into the catalyst bed from the trough arms 40. In a fluid catalytic cracking unit regenerator, air and the combustion or exhaust gases provide aeration for the catalyst in the bed.

In the prior art, the spent catalyst flowing through the trough arms 40 was aerated using air conveyed to the trough arms by small-bore piping. The invention herein avoids the need for the small-bore piping to convey aeration air to the trough arms 40 with a self-aerating spent catalyst distributor.

The contiguous lip 44 attached to the underside of the trough arms 40 captures the air and combustion gases rising upwardly through the bed of catalyst and uses these gases as an aeration fluid for the spent catalyst flowing in the trough arms 40. The orifices 56 in the bottom plate 48 allow the aeration fluid to pass from the underside of the trough arm 40 into the spent catalyst on the trough arm 40 where the aeration fluid fluidizes the spent catalyst. This invention enables the spent catalyst to flow readily through the trough arms 40 by keeping the spent catalyst fluidized using as aeration fluid the same medium that is used to aerate the bed of catalyst in the regenerator 12. Thus, the spent catalyst distributor 30 is considered self-aerating because separately conveyed aeration air is unnecessary. Unlike small-bore piping, the contiguous lip 44 is generally as durable as the trough arms 40. Thus, this invention eliminates the need for small-bore piping used to convey aeration fluid to the trough arms 40 and instead provides as aeration fluid the same medium used to aerate and fluidize the bed of catalyst in the regenerator 12.

The contiguous lip 44 is preferably divided by transverse separator plates 52 into a plurality of approximately equal sections to evenly distribute the aeration fluid along the length of the trough arms 40. An even distribution of aeration fluid facilitates the even and continuous flow of spent catalyst through the trough arms 40. The number of sections required for even distribution of aeration fluid varies, but typically ranges between two and twelve sections. One embodiment is shown in FIG. 4 in which the contiguous lip for a typical trough arm 40 is divided into four approximately equally sized sections.

As shown in FIGS. 6 and 7, the contiguous lip 44 can be flared outwardly from the bottom plate 48. This allows more aeration fluid to be captured than would be if the contiguous lip 44 were vertical.

The hole area of the orifices 56 and the vertical height of the contiguous lip 44 are sized to pass a proper amount of aeration fluid to the spent catalyst to provide proper fluidization of the spent catalyst. Aeration fluid rises in the regenerator 12 because there is a higher pressure in the bottom of the regenerator than in the top of the regenerator. By sizing the vertical height of the contiguous lip 44 properly, a sufficient amount of aeration fluid can be captured so as to create a driving force to pass air through the orifices 56 and into the spent catalyst in the trough arms 40. The vertical height of the contiguous lip 44 can be determined as the quotient of the vertical drop of the trough arms 40 divided by the number of sections created by the transverse separator plates 52. Thus, the vertical height of the contiguous lip 44 depends on the angle and extension of the trough arms 40.

For a given regenerator 12, it is known how much air is delivered through the main air grids 42. The configuration of the trough arms 40 and the pressure profile within the regenerator 12 are used to determine the available pressure for forcing aeration fluid through the orifices 56. Knowing the desired flow rate of aeration fluid into the spent catalyst in the trough arms 40, the size and number of orifices is determined using the available pressure.

The principles of the invention are illustrated by way of the following example:

EXAMPLE

The design calculations were developed for a self-aerating spent catalyst distributor according to the principles of the present invention. The design calculations were based on an existing fluid catalytic cracking unit having the general configuration shown in FIG. 8. The unit had a prior art spent catalyst distributor and small-bore piping that delivered a total of 776 kg/hr (1,711 lbs/hr) of aeration air. It was assumed for calculation purposes that the aeration fluid was air because the density of air was believed to be a reasonable approximation of the density of the combustion gases in the regenerator.

The amount of aeration fluid available for aeration was determined by multiplying a ratio of the trough bottom plate area to the regenerator area by the total air conveyed to the regenerator. With six trough arms 40 having a horizontal length from the centerline of 1.751 m (5.745 ft) and having a width of 0.250 m (0.8202 ft), the total area of the trough arms 40 was calculated at 2.6265 m$^2$ (28.271 ft$^2$). The cross-sectional area of the regenerator 12 less the area of the centerwell was 40.84 m$^2$ (439.6 ft$^2$). The trough area was calculated at 6.43% of the total area. Calculated total air flow to the regenerator 12 was 123,155 kg/hr (271,506 lbs/hr). Using the ratio of the trough area to the total area, up to 7,920 kg/hr (17,461 lbs/hr) of air was determined to be available for aeration of spent catalyst flowing through the trough arms. Since the required aeration air was known to be 776 kg/hr (1,711 lbs/hr), this quantity of aeration fluid was more than adequate. The orifice calculations could then be carried out to provide any amount of aeration, up to 7,920 kg/hr (17,461 lbs/hr), to aerate the spent catalyst.

The size and number of orifices required to deliver 776 kg/hr (1,711 lbs/hr) of air to the trough arms 40 was determined. First, a pressure profile for the trough arms 40 was calculated based on the elevation of the trough arms and the catalyst bed density. The pressure at the lowest point along the bottom plate 48 of trough arms 40 was calculated at 2.836 bara (41.14 psia) and at the highest point was calculated at 2.803 bara (40.66 psia). The vertical height of the trough arm between these points was 0.8165 m (2.679 ft) and the catalyst bed density in which the trough arms 40 were immersed was 413 kg/m$^3$ (25.8 lb/ft$^3$). The pressure difference between the lowest and highest points along the bottom plate 48 was 0.033 bar (0.48 psi).

The vertical height of the contiguous lip 44 was determined by dividing the trough arm 40 into four equally sized sections and then dividing the vertical height of the trough arm 40 by the number of sections. The vertical height of the trough arm 40 was 0.8166 m (2.679 ft), and there were four sections. Thus, the vertical height of the contiguous lip 44 was calculated at 0.2032 m (8 in.).

The contiguous lip of vertical height 0.2032 m (8 in) provides a pressure drop of 0.0083 bar (0.12 psi) to force aeration fluid through the orifices. A total of 776 kg/hr (1,711 lbs/hr) of aeration fluid was required to aerate all six trough arms 40. Each of the 24 sections thus required 32.33 kg/hr (71.3 lbs/hr) of aeration fluid for aeration.

The area of the orifices was determined by an iterative process using the equation $$\Delta P = \text{Pressure drop} = \rho V^2 / 2\ g_c C^2$$

wherein:

$\rho$ = aeration fluid density
= 1.00275 kg/m$^3$ (0.0626 lb/ft$^3$)

v=velocity in m/sec (ft/sec)
c=0.75
$g_c$=1.00 kg-m/N-sec$^2$ (32.2 lb-ft/lb$_f$-sec$^2$).

The pressure drop through the orifices had to be less than 0.0083 bar (0.12 psi) so that aeration fluid would preferentially pass through the orifices, where it would aerate the spent catalyst, rather than escape under the contiguous lip 44. The velocity term was based on a preference of approximately 30.48 m/sec (100 ft/sec) for the velocity of the aeration fluid through the orifices. Knowing that 776 kg/hr (1,711 lbs/hr) of aeration fluid having a density of 1.00275 kg/m$^3$ (0.06258 lb/ft$^3$) was required for aeration, the volumetric flowrate of the aeration fluid through the orifices was calculated at 0.21505 m$^3$/sec (7.5945 ft$^3$/sec). By iteration it was determined that a total orifice area of 0.00727 m$^2$ (0.0783 ft$^2$) provided by 48 orifices having a diameter of 13.891 mm (0.5469 in.) provided a velocity of 29.563 m/sec (96.99 ft/sec) through the orifices. Using the equation above, the pressure drop equated to 0.0078 bar (0.113 psi), which closely approximated the available 0.0083 bar (0.12 psi) per section.

It was thus determined that a desired mass flow rate of approximately 776 kg/hr (1,711 lbs/hr) of aeration fluid can be provided to the spent catalyst flowing in catalyst distributor 30 by a contiguous lip 44 that is 0.2032 m (8 in.) in vertical height having four approximately equal sections with each section having two orifices having diameters of 13.891 mm (0.5469 in.).

Likewise it was determined that a mass flow rate of 7,920 kg/hr (17,461 lb/hr) of aeration fluid can be provided to the spent catalyst flowing in catalyst distributor 30 by a contiguous lip 44 that is 0.2032 (8 in.) in vertical height having four approximately equal sections with each section having 24 orifices having diameters of 12.7 mm (0.50 in.).

The present invention is illustrated by way of the foregoing description and example. Various modifications will be apparent to those skilled in the art in view thereof. It is intended that all such variations within the scope and spirit of the appended claims be embraced thereby.

We claim:

1. A self-aerating spent catalyst distributor for a fluid catalytic cracking unit regenerator having a spent catalyst standpipe for receiving spent catalyst from a stripper, a valve to control catalyst flow, and a main air distribution system at a lower end of the regenerator for distributing aeration fluid into a bed of the catalyst for burning coke on the catalyst and for fluidizing the catalyst, comprising:

a centerwell for receiving catalyst at a lower end thereof from the standpipe for upward flow of spent catalyst to an upper end of the centerwell;

a plurality of trough arms extending radially outwardly and downwardly from the centerwell adjacent the upper end thereof to distribute spent catalyst into the catalyst bed, each arm including an elongated bottom panel, upwardly extending walls on opposite longitudinal sides of the panel, an open top, and an open distal end;

a contiguous lip extending downwardly from adjacent a perimeter of the bottom panels to capture a portion of the aeration fluid rising through the catalyst bed; and a plurality of orifices formed in the bottom panels to aerate spent catalyst in the trough arms with the aeration fluid captured by the lips.

2. The distributor of claim 1, comprising transverse separator plates to separate the lips into a plurality of sections to facilitate even distribution of the captured aeration fluid into the trough arms.

3. The distributor of claim 2, wherein the separator plates form from two to twelve approximately equal lip sections under each trough arm, each section containing a plurality of orifices.

4. The distributor of claim 3, wherein the separator plates form four approximately equal lip sections under each trough arm, each section containing a plurality of orifices.

5. The distributor of claim 1, wherein the orifices are sized to preferentially pass the captured aeration fluid through the orifices and inhibit passage of the captured aeration fluid under the lips.

6. The distributor of claim 1, wherein the lips provide a static head to force the captured aeration fluid through the orifices.

7. The distributor of claim 1, wherein the lips are vertical.

8. The distributor of claim 1, wherein the lips are flared outwardly from the bottom panels of the trough arms.

9. The distributor of claim 1, wherein the lips are flared inwardly from the bottom panels of the trough arms.

10. In a fluid catalytic cracking unit regenerator having trough arms extending out from a centerwell for distributing catalyst into a catalyst bed above a main air distribution system for introducing aeration fluid into the bed to regenerate and fluidize the spent catalyst, the improvement comprising:

a contiguous lip extending downwardly from each trough arm;

a plurality of orifices formed in a bottom of each trough arm;

wherein the lip captures aeration fluid from the catalyst bed and creates a static head to force the captured aeration fluid through the orifices and aerate spent catalyst passing through the trough arms.

11. The distributor of claim 10, comprising transverse separator plates to separate the lips into a plurality of sections to facilitate even distribution of the captured aeration fluid into the trough arms.

12. The distributor of claim 11, wherein the separator plates form from two to twelve approximately equal lip sections under each trough arm, each section containing a plurality of orifices.

13. The distributor of claim 12, wherein the separator plates form four approximately equal lip sections under each trough arm, each section containing a plurality of orifices.

14. The distributor of claim 10, wherein the orifices are sized to preferentially pass the captured aeration fluid through the orifices and inhibit passage of the captured aeration fluid under the lips.

15. The distributor of claim 10, wherein the lips provide a static head to force the captured aeration fluid through the orifices.

16. The distributor of claim 10, wherein the lips are vertical.

17. The distributor of claim 10, wherein the lips are flared outwardly from the bottom panels of the trough arms.

18. The distributor of claim 10, wherein the lips are flared inwardly from the bottom panels of the trough arms.

* * * * *